United States Patent
Byers et al.

(10) Patent No.: US 7,088,704 B1
(45) Date of Patent: Aug. 8, 2006

(54) TRANSPORTING VOICE TELEPHONY AND DATA VIA A SINGLE ATM TRANSPORT LINK

(75) Inventors: Charles C. Byers, Aurora, IL (US); Mary D. Miller, Lake Hiawatha, NJ (US); Shella A. Paskel, Florham Park, NJ (US); James P. Runyon, Wheaton, IL (US); John Tardy, Somerville, NJ (US); John D. Unruh, Mendham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/458,768

(22) Filed: Dec. 10, 1999

(51) Int. Cl.
   *H04L 12/00* (2006.01)
   *H04L 12/66* (2006.01)
   *H04L 12/28* (2006.01)

(52) U.S. Cl. .................... 370/352; 370/395.1

(58) Field of Classification Search ............ 370/351, 370/352–356, 389, 392, 395.1, 398, 395.4, 370/395.5, 401, 464, 465, 466, 467, 395.6, 370/395.51
See application file for complete search history.

(56) References Cited

U.S. PATENT DOCUMENTS

| | | | |
|---|---|---|---|
| 5,170,272 A * | 12/1992 | Onno ........................ 370/534 |
| 5,287,348 A * | 2/1994 | Schmidt et al. ............. 370/352 |
| 5,327,421 A * | 7/1994 | Hiller et al. ........... 370/395.61 |
| 5,422,882 A * | 6/1995 | Hiller et al. ................ 370/352 |
| 5,426,636 A * | 6/1995 | Hiller et al. ................ 370/352 |
| 5,428,607 A * | 6/1995 | Hiller et al. ................ 370/352 |
| 5,793,766 A * | 8/1998 | Dieudonne et al. ...... 370/395.1 |
| 5,809,022 A * | 9/1998 | Byers et al. .......... 370/395.51 |
| 5,889,773 A * | 3/1999 | Stevenson, III ............. 370/352 |
| 5,953,330 A * | 9/1999 | Canniff et al. .............. 370/352 |
| 6,097,699 A * | 8/2000 | Chen et al. ................. 370/231 |
| 6,111,879 A * | 8/2000 | Choi ..................... 370/395.61 |
| 6,125,117 A * | 9/2000 | Martin et al. ............... 370/397 |
| 6,289,018 B1* | 9/2001 | Song ....................... 370/395.6 |
| 6,704,327 B1* | 3/2004 | Gardner et al. ............. 370/467 |
| 6,807,177 B1* | 10/2004 | Henrion ................... 370/395.1 |

* cited by examiner

*Primary Examiner*—Hassan Kizou
*Assistant Examiner*—Hong Sol Cho (57) ABSTRACT

A method and system for asynchronously transporting narrowband and broadband transmissions over a link includes providing at least one host terminal or at least one network unit for receiving and transmitting communications over a transmission line. Narrowband transmissions are converted to and from composite asynchronous transfer mode (ATM) cells by separating data and signaling of each channel into separate byte positions in the composite ATM cells. The composite asynchronous transfer mode (ATM) cells are transferred over the transmission link. The composite asynchronous transfer mode (ATM) cells include both narrowband and broadband composite cells such that an entire bandwith of the transmission line is available for both narrowband and broadband transmissions.

28 Claims, 6 Drawing Sheets

TRANSPORTING VOICE TELEPHONY AND DATA VIA A SINGLE ATM TRANSPORT LINK

BACKGROUND OF THE INVENTION

1. Field of the Invention

The present invention relates to information transport systems, and more particularly to a link for transporting both data and voice information over a single asynchronous transfer mode system.

2. Description of the Related Art

Transmission systems are employed to transfer or transport information between different locations. Access networks which are presently in use provide asynchronous transfer for either data or voice. Conventional access systems typically include dedicated channels for employing data transfer and different channels for the voice transfer.

Several access network configurations, including fiber-in-the-loop (FITL), employ a host digital terminal (HDT) that interfaces with one or more service networks and serves multiple distant terminals via dedicated transmission links. The distant terminals, which may include, for example, an optical network unit (ONU), hold line cards that connect to each subscriber's dedicated circuit. On the network side of the HDT, services are transported over facilities dedicated to the service type, for example, time division multiplexing (TDM) or asynchronous transfer mode (ATM).

Although the services, including data transfer and voice transfer may share the same physical medium, as in a synchronous optical network (SONET) connection, for example, the services must be carried in separate tributaries, i.e., on separate channels. Between the HDT and the ONU, the two traffic types must share the same medium for economy, for example, the cost of the link is critical for a FITL access network.

Since the services need separate tributaries, conventional systems must predetermine channels for carrying data and predetermine channels for carrying voice transmissions, for example. This limits the available bandwidth to predetermined portions. Data channels cannot be employed for transferring voice and voice channels cannot be employed for transferring data. This results in a bottleneck if more data or more voice information must be transferred than the dedicated channels can accommodate.

Systems for transporting TDM telephony and ATM data in different tributaries of the transmitted signal have suffered several drawbacks. The allocation of bandwidth between the two traffic types is not flexible and the implementation typically leads to separate hardware shelves for each traffic category at each end of the link. Standards for full-service access network describe an all-ATM host terminal to ONU link for passive optical networks (PONs), however the transport of voice services is not well defined and the multi-access functions required a complex control scheme and new devices.

Therefore, a need exists for a system and method which supports high quality voice transmission and data transmission at the rates needed by service categories (e.g., asymmetric digital subscriber line (ADSL), high bit-rate digital subscriber line (HDSL), etc.). A further need exists for a hardware implementation of such a system which employs off-the-shelf components to reduce costs.

SUMMARY OF THE INVENTION

A method for asynchronously transporting narrowband and broadband transmissions over a link includes providing at least one host terminal or at least one network unit for receiving and transmitting communications over a transmission line. Narrowband transmissions are converted to and from composite asynchronous transfer mode (ATM) cells by separating data and signaling of each channel into separate byte positions in the composite ATM cells. The composite asynchronous transfer mode (ATM) cells are transferred over the transmission link. The composite asynchronous transfer mode (ATM) cells include both narrowband and broadband composite cells such that an entire bandwith of the transmission line is available for both narrowband and broadband transmissions.

A system is also disclosed for asynchronously transporting narrowband and broadband transmissions over a link. The system includes at least one host terminal for receiving communications from and transmitting communications to a back plane, and at least one network unit which is coupled to the at least one host terminal by a transmission line. The at least one host terminal and the at least one network unit each include a circuit pack for converting narrowband communications to and from composite asynchronous transfer mode (ATM) cells such that an entire bandwith of the transmission line is available for both narrowband and broadband transmissions.

A system for asynchronously transporting data and voice telephony over a link includes a host digital terminal for receiving communications from and transmitting communications to a back plane. The back plane provides both narrowband and broadband communications from a network. An optical network unit is coupled to the host digital terminal by an optical transmission line. The host digital terminal and the optical network unit each include a circuit pack for converting the narrowband communications to and from composite asynchronous transfer mode (ATM) cells. The circuit pack includes a narrowband interface and a broadband interface for selectively transporting information over the optical transmission line such that an entire bandwith of the optical transmission line is available for both voice telephony and data transmissions.

In alternate methods and embodiments, the composite ATM cells include pairs of ATM cells and may include the step of constructing a first composite cell of the pair which includes data for a plurality of channels and a second composite cell of the pair which includes signaling information associated with each of the plurality of channels. The composite ATM cells are transferred periodically and the may include the step of transporting the first composite ATM cell of each pair every period and the second composite ATM of each pair every fourth period. The method may further include the step of connecting the host terminal to an optical network unit by employing the transmission line. The composite ATM cells may include pairs of ATM cells wherein a first composite cell of the pair includes data for a plurality of channels and a second composite cell of the pair includes signaling information associated with each of the plurality of channels.

Each pair of cells may be logically linked to reassemble the data to the signaling information for each channel. The narrowband transmission may include voice telephony data for a plurality of channels in the first composite ATM cell of each pair and signaling information associated with each of the plurality of channels in the second composite ATM cell of each pair.

The narrowband transmission may include integrated services digital network (ISDN) data for a plurality of channels in the first composite ATM cell of each pair and signaling information associated with each of the plurality of channels in the second composite ATM cell of each pair. The narrowband transmission may include an ATM cell including both integrated services digital network (ISDN) data and voice telephony data. The circuit pack may include a narrowband interface for converting pulse-modulated signals to and from the composite asynchronous transfer mode (ATM) cells.

The circuit pack may include a broadband interface for converting broadband signals to and from the composite asynchronous transfer mode (ATM) cells. The circuit pack may also include a multiplexer for addressing information between a narrowband and a broadband interface. The network unit may be co-located with a service subscriber. The composite ATM cells may include header information employed for directing the composite ATM cells to a destination. The composite ATM cells may include a first composite cell which includes data for a plurality of channels, a second composite cell which includes signaling information associated with each of the plurality of channels and a third composite cell which includes messaging information associated with each of the plurality of channels.

The composite ATM cells may each include data for a plurality of channels, signaling information associated with each of the plurality of channels and messaging information associated with each of the plurality of channels. The narrowband interface preferably converts pulse-modulated signals to and from the composite asynchronous transfer mode (ATM) cells. The broadband interface preferably converts broadband signals to and from the composite asynchronous transfer mode (ATM) cells. The circuit packs may include a multiplexer for selectively transporting information between the narrowband and the broadband interfaces.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a communications access network including an extension of a host digital terminal's (HDT's) transmission fabric to a distant network unit, for example, an optical network unit (ONU) or equivalent, in a cost effective and scaleable manner. An access network provides access between service subscribers and a service provider. In the access network, the HDTs either are located in proximity of a switch or are connected to the switch via high-capacity transmission systems. The network units are preferably located in close proximity of the subscriber, and more preferably, to achieve the maximum deliverable bandwidth, the network units may be located in close proximity of, or are co-located with, subscribers.

The network unit (NU) link includes a specialized server circuit pack in the host terminal (HT), a matching common pack in the NU, and the optical fiber or electrical line connecting the two. The server circuit pack is called an applications pack, for example, an Optical Applications Pack (OAP). The server circuit pack and common pack (e.g., OAP) may be referred to as circuit packs.

A NU controller is included whose designation depends on the NU employed. Effectively, the telephony and data interfaces appearing on a backplane (e.g., an ANYMEDIA™ access system (AMAS) shelf) are transferred to the NU. The NU link design provides a method of transporting telephony data and signaling, a method of transporting data, and a method of extending the host shelf control links to the NU.

The present invention provides an all-ATM format network unit link—to link host terminals to network units. The link provides an efficient and flexible transport method for voice and data services over a common transmission medium. For transport over the link, the time-division multiplexed (TDM) circuits, such as voice and ISDN services, are transformed into Asynchronous Transfer Mode (ATM) format cells that are multiplexed with ATM cells transporting data. Transmission over the link is in ATM format and the bandwidth available for each of the two traffic types can advantageously be flexibly allocated between data and voice. The present invention will now be described in greater detail with reference to the drawings.

Figure 1:
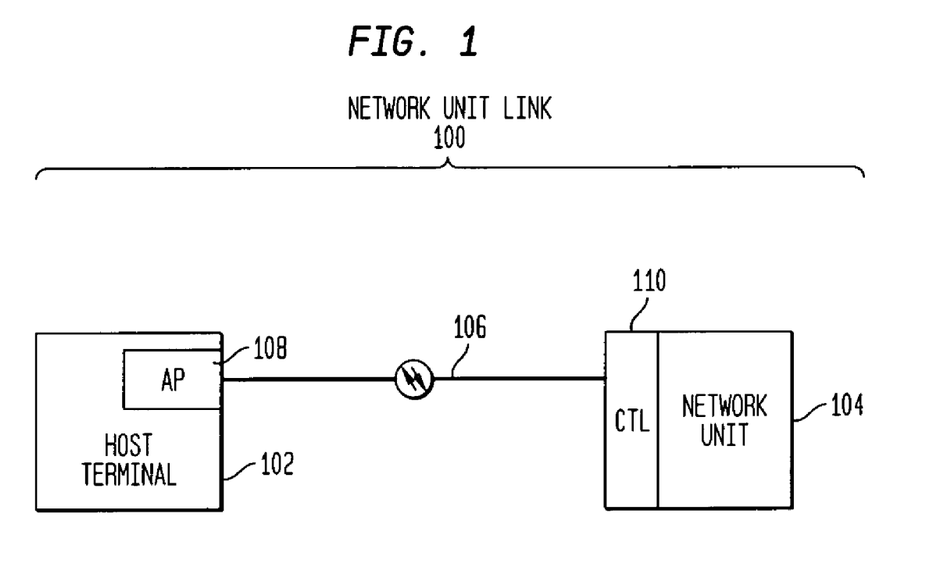
FIG. 1 is a schematic diagram showing a network unit link in accordance with the present invention.
Figure 2:
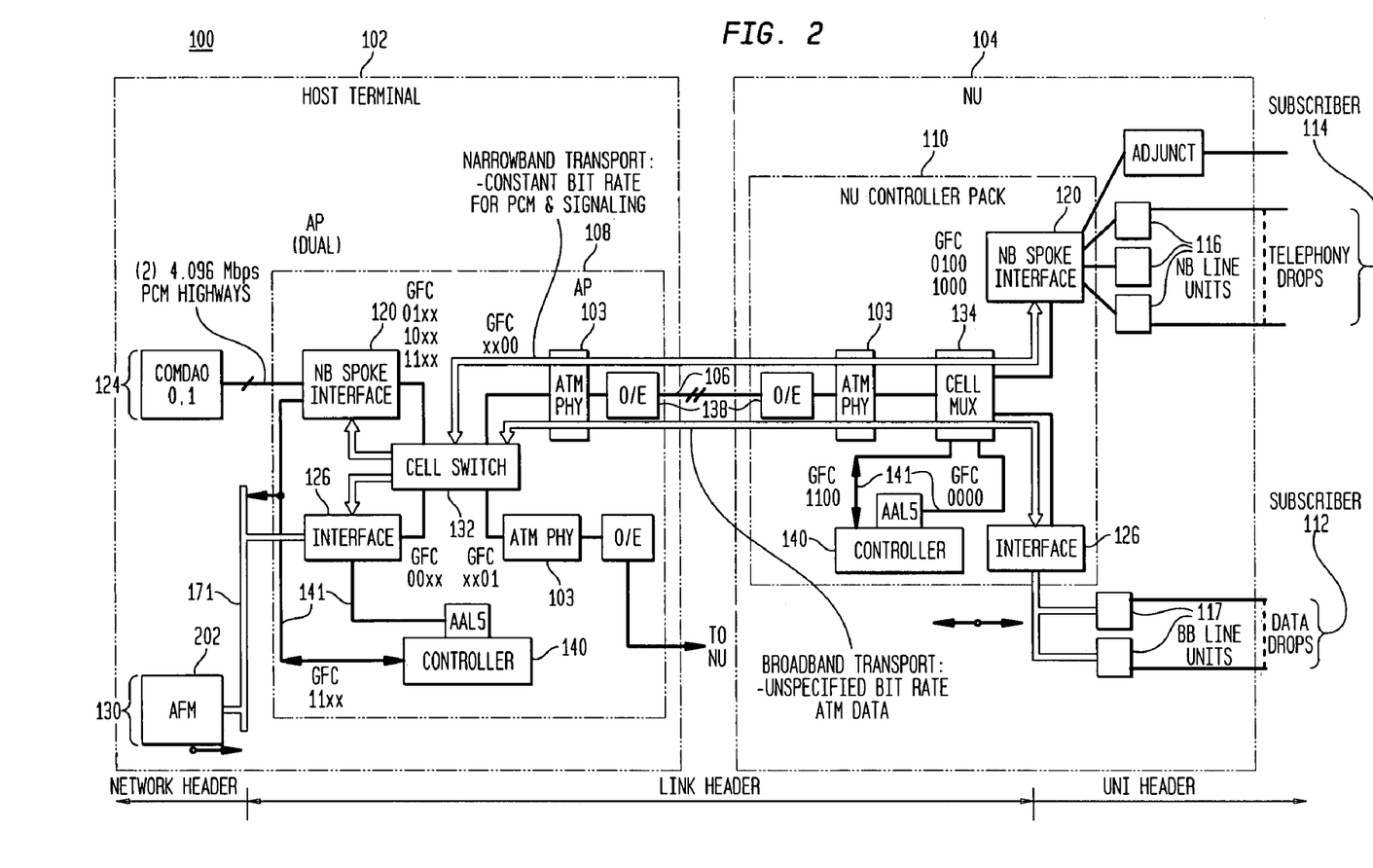
FIG. 2 is a schematic diagram showing a system for transporting narrowband and broadband transmissions and signaling in accordance with one embodiment of the present invention.

It is to be understood that the elements shown in FIGS. 1 and 2 may be implemented in various forms of hardware, software or combinations thereof. Preferably, these elements are implemented in software on one or more appropriately programmed general purpose digital processors having a memory and input/output interfaces. It is also to be understood the data rate, the number of channels, types of channels and protocols may be changed within the scope of the present invention.

Referring now to the drawings in which like numerals represent the same or similar elements and initially to FIG. 1, a network unit link or system 100 is illustratively shown in accordance with the present invention. System 100 includes at least one host terminal 102 and at least one network unit 104. The present invention will now be described in terms of a single host terminal 102 and a single network unit 104 which are linked by a transmission line 106. Transmission line 106 may include an optical fiber or an electrical line. An application pack 108 (circuit pack) is included at host terminal 102 which provides the needed functions to transfer telephony and data information to a network controller or network unit (NU) 104. NU 104 includes a common pack or controller (CTL) pack 110 (circuit pack) which is similar to application pack 108 of host terminal 102.

In a preferred embodiment of system 100, an optical layer, if optical transmission is employed, includes a host terminal 102 to NU 104 optical link that preferably has a 155.52 Mbps rate. Higher rates are also contemplated. One single-mode fiber with wavelength division multiplexing (WDM) for bidirectional transmission may be employed. The nominal wavelengths used may include 1550 nm downstream (toward NU 104) and 1310 nm upstream (toward the network or host terminal 102). The optical link may span about 36,000 feet, the following high-level optical parameters are listed for illustrative purposes only; transmitted power: −8 dBm +/−2 dBM, receiver sensitivity: −23 dBm or better, 12 dB loss budget, including fiber, connectors, splices and maximum −20 dBm reflection. The listed parameters are applicable to both ends (host and NU) of the link 100. The physical connections to the optical link may employ SC type connectors or equivalents.

On the physical layer, the format to signal to/from the optical/electrical (line) interface is preferably STS-3c, which includes 2430 bytes per frame, at 8000 frames per second. Other interfaces are contemplated which may employ higher transfer rates. The STS-3c SONET format includes 81 transport overhead (SOH) bytes and 9 path overhead (POH) bytes, a total of 90 bytes of overhead. 2340 bytes/frame are available for cell transmission use. The system side interface of the transport path terminating device (PHY device) may transfer about 353,000 cells/sec (~44.15 cells/frame) transferred in each direction and may be employed in many applications, for example, for digital video services.

NU Link 100 preferably transports all traffic in the Asynchronous Transfer Mode (ATM) to minimize interface complexity and cost, and for maximum flexibility. The ATM-layer interface preferably conforms to ATM Forum User-Network Interface Specifications, Version 3.1 (or later).

NU Link 100 advantageously transports several categories of payload. These include narrowband data and signaling, broadband data and signaling and NU control and operations, administration, maintenance and provisioning (OAM&P) messages (messaging). Narrowband includes a transmission medium or channel with a single voice channel (with a carrier wave of a certain modulated frequency). Broadband refers to telecommunication that provides multiple channels of data over a single communications medium, typically using some form of frequency or wave division multiplexing.

Referring to FIG. 2, system 100 employs a physical layer 103, which may employ a SONET-rate (e.g. 155 Mbits/sec in current designs). Other data rates may be employed. An all-ATM transport layer is also preferably employed. An all-ATM transport layer includes hardware (or software) for supporting all-ATM transfers.

A preferable transport format for narrowband transport includes one or more virtual circuits (VCs) transporting pulse code modulation (PCM) data for time division multiplexed (TDM) (voice and 64-Kbps data) digital signal 0 (DS0) circuits in an ATM adaptation layer 0 (AAL-0). A virtual circuit is a circuit or path between points in a network that appears to be a discrete, physical path but is actually a managed pool of circuit resources from which specific circuits are allocated as needed to meet traffic requirements. The transfer format formats composite cells in accordance with the present invention. Composite cells are cells which include packets of information for a plurality of channels (See FIGS. 3–5)

In one embodiment, the AAL-0 composite cells are preferably transmitted at 8000 cells per second at uniform intervals. The composite cells transport data for up to 48 DS0 circuits. One PCM VC is needed for every 48 DS0 rate circuit, or part thereof. Other systems may employ composite cells for a greater number of circuits.

One or more VCs are employed for transporting bit-oriented signaling or ISDN D-channel data in AAL-0 formatted composite cells, transmitted at 2000 cells per second at uniform intervals. One signaling VC is needed for every 48 DS0 rate circuits, or part thereof. Other systems may employ composite cells for a greater number of circuits at other rates.

Another VC transports messages between host terminal 102 and NU 104 mapped into AAL-0 format cells and transmitted at varying intervals. One or more VCs are included for transporting data or other services connecting to data subscriber terminations 112 and 114 in NU 104. Any ATM Forum compliant cell format can be transmitted, at the rates needed for a given service. One or more VCs are employed for transporting ATM provisioning and signaling data in standard AAL-5 format ATM cells. One such VC is employed for NU common pack or controller pack 110 and one for each of the data line cards 116 and 117 in NU 104.

Applications pack 108 of NU link 100 includes an interface 120 to a TDM part of a backplane 124 and maps a required number of DS0 PCM data bytes to one or more AAL-0 composite cells, for example, once every 125 microseconds. Interface 120 includes an ATM bus, and may include, for example, a Utopia™ Interface (UTOPIA is a trademark of PMC-Sierra, Inc.). A required number of DS0 signaling bytes are mapped to one or more AAL-0 composite cells, for example, once per 500 microseconds (i.e., every four frames). Control and signaling messages are mapped between host formats and the control link formats by employing composite ATM cells, as needed (See FIGS. 3 and 4).

An interface 126 to an ATM part of backplane 130 receives or transmits ATM data via an ATM bus interface (broadband portion). ATM bus may include a CELL-BUS (CELL-BUS is a trademark of TransSwitch, Inc.).

Switches or multiplexers 132 and 134 are included to multiplex and de-multiplex the ATM cell streams to/from TDM interface 120 and ATM interface 126. In the case of multi-port application packs 108, combined data from interfaces 120 and 126 are de-multiplexed and multiplexed into streams connecting to each NU 104. An ATM framer 138, for example, an STS-3c framer, and ATM Phy-layer device 103, for example, a PM5350 S/UNI-ULTRA commercially available from PMC-Sierra Inc., are employed to terminate the transmission path. Some of the functions of ATM-Phy 103 and framer 138 are included in Table 1 for an optical transmission line 106:

TABLE 1

| Upstream | Downstream |
| --- | --- |
| Receives 155.52 Mbps electrical signal | receive ATM cells from interface device 120 |
| Frames on received STS-3c signal | store cells in internal FIFO |

TABLE 1-continued

| Upstream | Downstream |
|---|---|
| Recovers clock and data Processes section, line and path overhead Performance Monitoring ATM cell delineation ATM cell header error detection & correction ATM cell payload de-scrambling (optional) GFC bit-extraction de-jitter buffering transmit cells via interface 120 Level 1 port to multiplexer provide outputs for indicating transmission activity or alarms | insert idle cells as needed generate header check sequence (HCS) byte scramble ATM cell payload (optional) synthesizes line clock from 19.44 MHz ref. insert section, line, path overhead transmits SONET/SDH frames at STS-3c (STM-1) rate |

In a preferred embodiment, a SONET-rate transmission is employed. ATM framer 138 may include an optical/electrical interface which is provided to convert optical signals to electrical signals and vice versa. Interface 138 is employed when transmission line 106 is an optical fiber. Controllers 140 are employed to facilitate the synchronization of NU 104 and the host shelf TDM backplane 122.

The AP circuit pack 108 provides an interface between backplane 124 and 130 and preferably two NU transmission lines. "Downstream" refers to the direction from the backplane 124 and 130 towards the NU 104, while "Upstream" refers to traffic coming from the NU 104 towards the backplane, (e.g., to COMDAC (common data and control) or to the AFM (ATM feeder multiplexer). COMDACs are employed to provide control over the data transfer process and provide the data via PCM highways. ATM feeder multiplexers (AFMs) are employed to route information in cells in both the upstream and the downstream directions. COMDACs and AFMs are known to those skilled in the art.

Interface 120 interfaces to the backplane 124 PCM Highways via an FPGA (field programmable gate array) that maps the PCM Highway data to ATM cells and provides, for example, a UTOPIA Level 1 interface toward the transmission network. It preferably has four PCM Highway interfaces to the backplane 124 that may used as follows in the AP 108:

one pair of PCM Highways connect to COMDAC 0 in the shelf; and a second pair of PCM Highways connect to COMDAC 1.

Each pair may include one dedicated PCM Highway with all DS0 timeslots assigned to the AP 108 in an AP slot, and a second PCM Highway that is shared with an adjacent AP, with nominally 16 timeslots assigned to each. The transmission functions provided by this interface 120 are illustratively shown for one embodiment of the invention in Table 2.

TABLE 2

| Upstream | Downstream |
|---|---|
| Store the payload bytes of each valid arriving cell in an ingress buffer: PCM data, signaling or message buffer, depending on the GFC bits set in the cell header. | From each incoming PCM highway timeslot, map the PCM byte into the buffer for PCM composite cell formation and map the signaling byte into the signaling buffer. Up to 48 PCM or signaling bytes can |

TABLE 2-continued

| Upstream | Downstream |
|---|---|
| On each 8 kHz clock (PCM highway frame) begin mapping the PCM data and signaling buffer contents to the PCM highways. PCM data is mapped to the lower byte of the PCM Highway timeslot, signaling to the upper byte. Store incoming messages in a queue available for onboard controller to read and process. | be mapped to one AAL-0 composite cell. Generate cell header bytes based on provisioned data. The cell header GFC bits are set to designate the target NU and the data type included in the cell payload. After each 8 kHz clock, transmit the PCM data cells in the first available cell-slots on interface device 120 After every fourth 8 kHz clock, transmit the signaling data cells, after the PCM data cells for the frame have been transmitted. Upon the receipt of a message from the onboard controller into the downstream message buffer, map the message into an AAL-0 cell and set the GFC bits of the cell to designate the recipient (target) NU and that the data is a message. Transmit the message cells via interface 120, as needed. |

For compatibility with the maintenance strategy for other narrowband APs, the AP's interface 120 maps the downstream PCM and signaling data of one timeslot to the corresponding upstream PCM and signaling bytes (DS0 loopback), when so directed by controller 140.

In addition to the transmission functions, interface 120 terminates the ATM portion of the AP-to-NU message link. The message link is also transmitted in the AAL-0 format cells.

Multiplexers 132 and 134 route traffic in either direction of transmission. In the downstream direction, multiplexer 132 combines the ATM cells received from the interface 120 and interface 126 and routes the appropriate cells to transmission lines 106. In the upstream direction, multiplexer 132 combines the ATM cells received from the NU lines 106 and routes them either to the interface 120 or interface 126, as appropriate. Multiplexer 134 functions in a similar manner to multiplexer 132.

Interface 120 produces only a few cells at the start of each frame, once these clear, the remainder of the frame is available for data traffic. The resultant cell-flow should result in "isochronous" transmission of narrowband data, with a maximum delay of one frame (125 microseconds). This simple flow control also reduces the probability of a need for a deeper buffer for data traffic.

Controllers 140 include a digital signal processor (DSP) for circuit pack control. Controller 140 communicates with the ATM Phy devices 130, multiplexers/demultiplexers 132 and 134, interface 120, and interface 126 devices over a control (address and data) bus 141. Controller 140 also has a serial link to an EEPROM, for example, that stores factory inventory information. The following control functions may be supported: circuit pack initialization, message communications to the active COMDAC over a UART link, message communications with the AFM in the shelf (for example, AMAS), provisioning of all programmable devices (with data received from the COMDAC or the AFM), maintenance and alarms (CLF, AIS, Yellow, loopbacks, faceplate LED), performance monitoring of NU Links, overhead processing of NU Links SONET frames (if needed), Built-in Self-Test, Diagnostics, enhanced inventory, etc.

An 8-kHz synchronization signal from the active COMDAC is used as a frame reference for transmission between the AP and COMDAC packs via the PCM Highways, and between the AP and the subtending NUs via lines 106.

Figure 3:
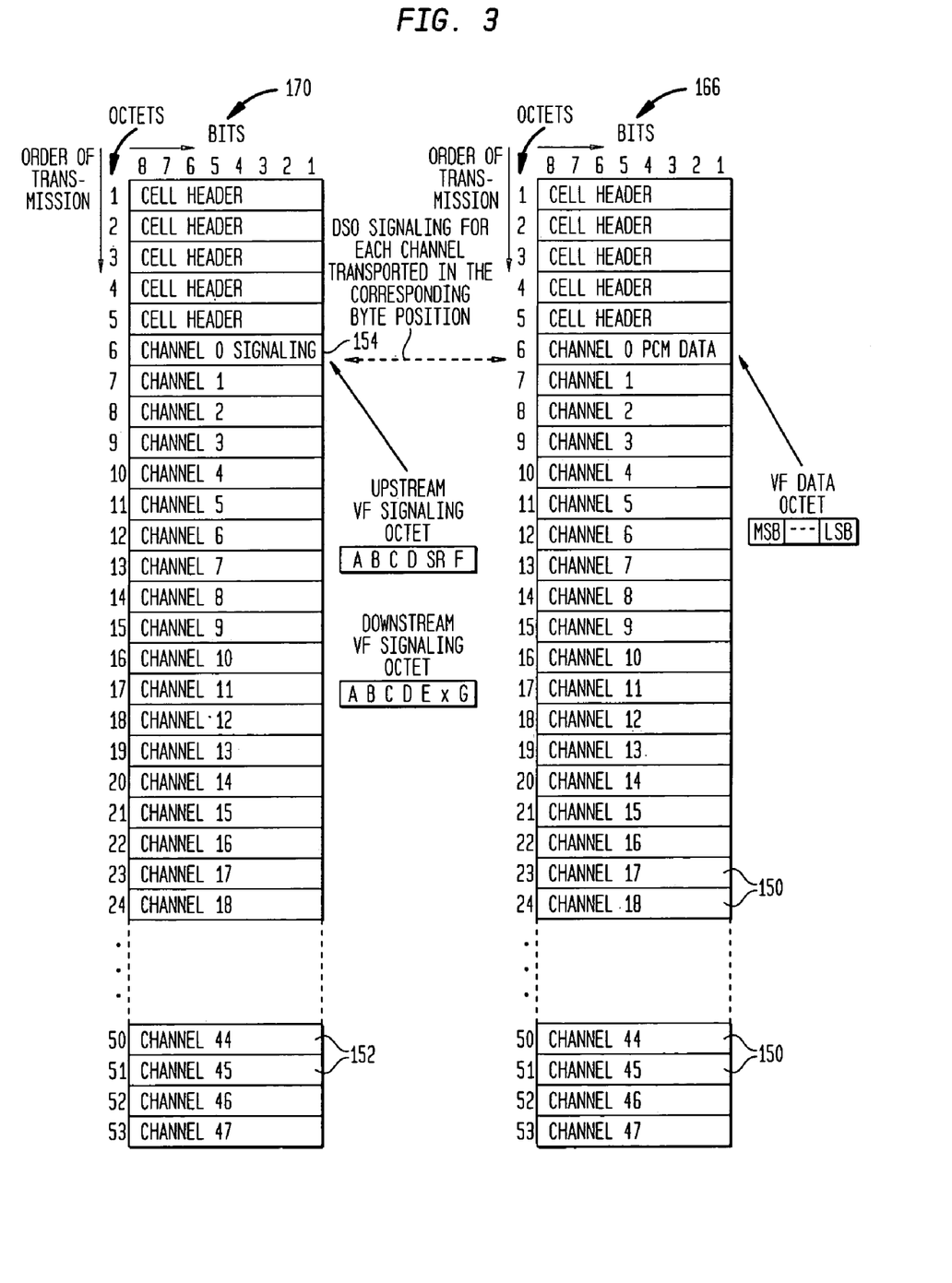
FIG. 3 shows a composite ATM cell for transporting 64 kbit/sec telephony services (e.g., voice, etc.) communications asynchronously in accordance with the present invention.

Referring to FIG. 3, narrowband data and signaling transport are provided by employing cell formats as shown. Narrowband data (e.g., DS0 PCM data, ISDN B-channel data, etc.) are transported via a CBR (constant bit rate) virtual circuit linking host terminal 102 to NU 104 (FIG. 2), using the 48 payload octets 150 of, for example, AAL-0 composite ATM cells. In one embodiment, the transmission rate per channel is 64 kbps for PCM data. The virtual circuit serving NU 104 is transmitted at a constant of 8000 cells/second rate in each direction and provides transmission bandwidth for up to 48 DS0 channels. Multiple virtual circuits may be employed to serve larger NUs to achieve higher total cell-rates, e.g., 16 Kcells/sec for 96 DS0s, etc.

Transmission channels normally are assigned sequentially, with the first payload octet serving channel 0 and the last payload octet serving channel 47. Unused channels will carry idle-code (e.g., all 1-s). Each terminus of the NU Link includes a timeslot mapping function to map the NU Link payload to/from the host terminal or NU from/to backplane PCM Highways (122 of FIG. 2).

The timing of the transmission of the PCM cells is linked to, but not necessarily phase-locked to, a system clock, for example, a 8-kHz clock. This means that the cell will be transmitted after it received its full payload, i.e., after a frame pulse. It may be delayed at the interface 120 for one or more cell transmission periods (cell delays) due to other traffic. For example, if multiplexer 132 follows a round-robin protocol, the PCM Cell may not be transmitted until each cell present at each of the device's other ports is handled.

Narrowband signaling is transmitted via a second virtual circuit linking the host terminal HT and the NU which uses signaling cells 152 (e.g., AAL-0 cells) of the same form as the PCM cells 150, but is transmitted at, for example, ¼ of the transmission rate for the PCM cells 150. The payload of the signaling cells 152 are mapped identically to the PCM cells 150, i.e., the signaling byte for channel 0 will occupy the first payload octet of the cell, the signaling byte for channel 47 will occupy the last.

A signaling byte 154 for each DS0 channel includes the ABCD signaling bit in bit positions 1 through 4, with trunk-processing signals carried in the upper bit positions. In the upstream direction, one bit is reserved to indicate a service request (SR bit), i.e., to indicate an off-hook or on-hook state. In some systems, this bit can be ignored. The signaling bytes 154 of unused channels carry benign code.

The virtual circuits serving as PCM data and signaling transport are autonomously established when the host terminal-NU link is turned up, as part of the initial "handshake" between the server pack (applications pack (AP)) in the host terminal and the common pack in the NU.

The use of the A, B, C, and D signaling bits may be defined as known in the art. The use of the E, F, and G "trunk processing bits" may be defined as follows:

E bit—indicates facility fault, and is set by each transmission link interface in the direction of the failed received signal. The receiving interface is expected to freeze the channel's signaling state. The E-bit can be set when it detects facility failure in the downstream direction and may be used to freeze the ABCD bits. It is preferably not used in the upstream direction.

F bit—instructs transmission interfaces to turn off robbed-bit signaling, where applicable. It is set by certain channel units in the upstream direction.

G bit—initiates trunk processing in channel units in a NU adjunct. It is transmitted by the host toward the NU.

Figure 4:
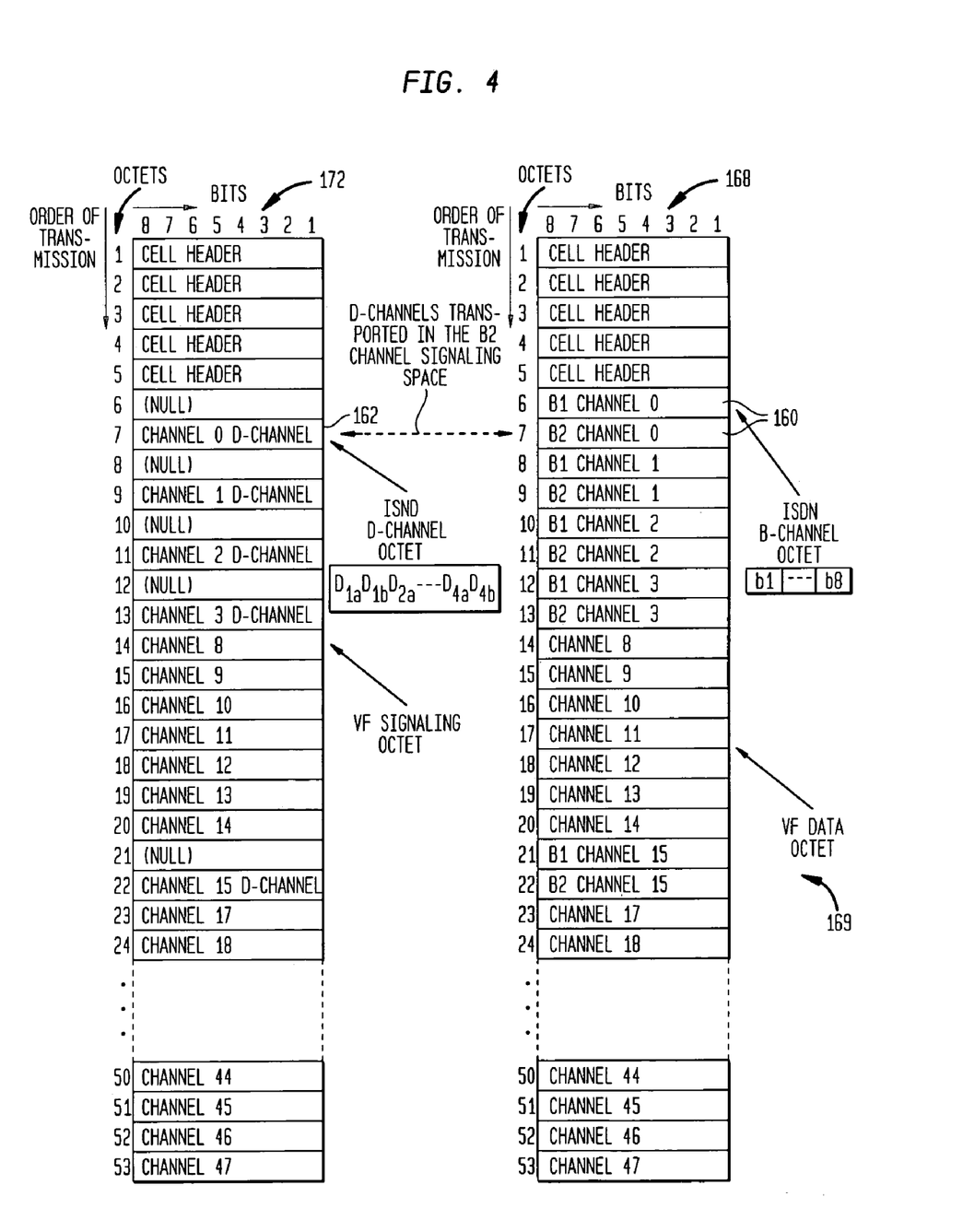
FIG. 4 shows a composite ATM cell for transporting integrated services digital network (ISDN) format signals, a mixture of telephony and data, asynchronously, in accordance with the present invention.

Referring to FIG. 4, transport for mixed integrated services for digital network (ISDN) and DS0 services is provided in a similar manner as described with reference to FIG. 3. Transmission information is split into formatted cells. ISDN basic rate interface (BRI) service B1 and B2 channels are transmitted in two data octets 160, as PCM data. Any pair 160 of data octets can be provisioned for ISDN B-channel transport. ISDN D channels are transmitted in a signaling byte 162 associated with the last B channel of the service with four 2-bit D-channel nibbles of the same service concentrated in one byte and transmitted, for example, every 500 microseconds. This will maintain the 16 kbps rate for the D-channels, however the host terminal and NU should accumulate four frames of D-channel data prior to transmission and buffer the received data prior to mapping the received D-channel byte to the backplane as four consecutive 2-bit nibbles.

Referring to FIGS. 3 and 4, cell routing over the NU link 100 includes forming the cells for transmission across the link by separating out voice frequency (VF) or ISDN B channel data and placing this information in cells 166 and 168. Cells 170 and 172 include signaling associated with the voice channels and/or D channel information associated with the B channels. As shown in FIG. 4, telephony data and signaling octets may be transported in cells 168 and 172 along with data octets from an ISDN line. By pairing cells in a composite format both narrowband and broadband data are transported together in a single composite ATM cell 169.

Figure 5:
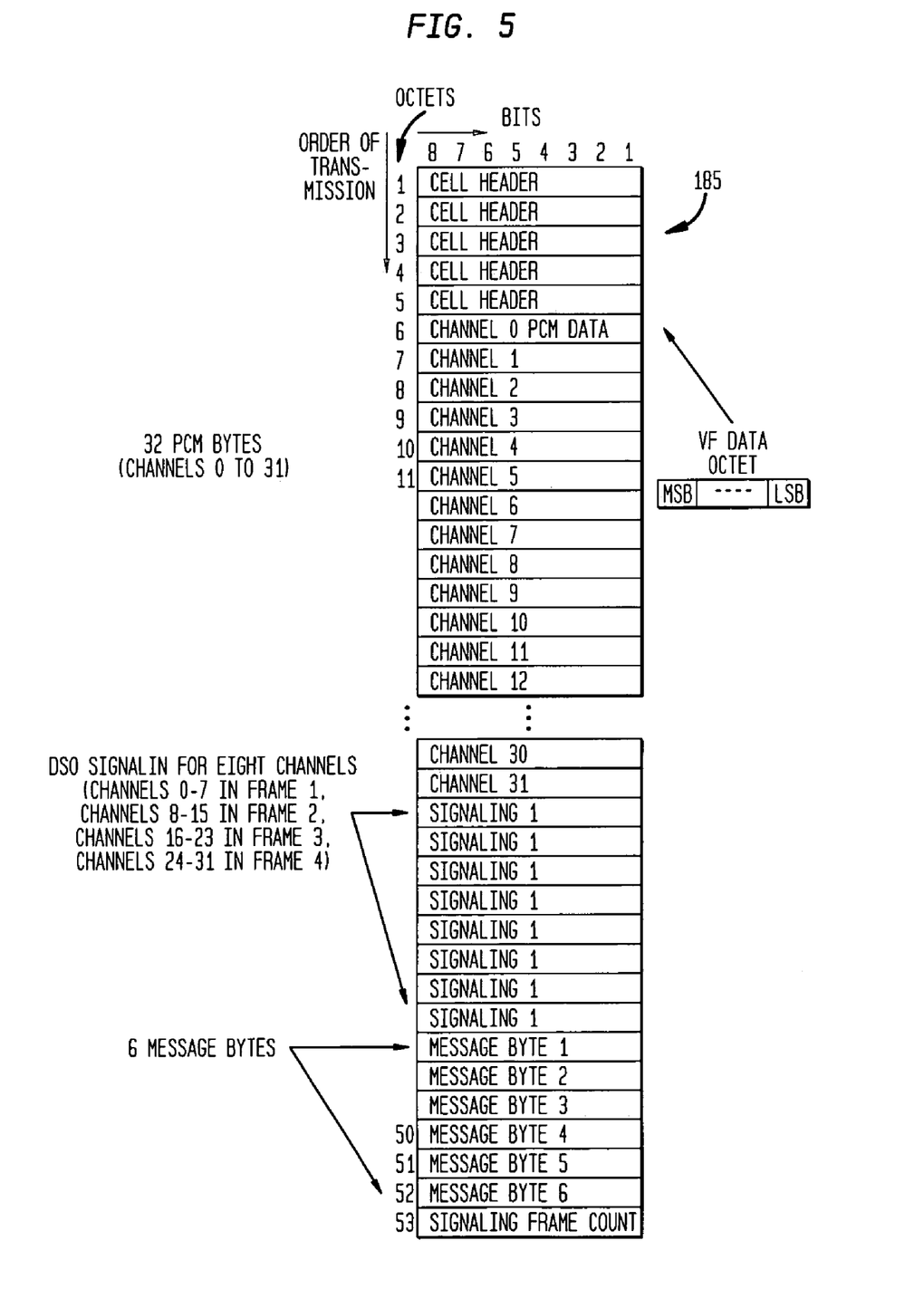
FIG. 5 shows a composite ATM cell for transporting PCM data, signaling and messaging in a single cell in accordance with another embodiment of the present.

Referring to FIG. 5, in an alternate embodiment of the present invention, PCM data, signaling and messaging may be mapped to a single ATM composite cell 185. In the illustrative embodiment shown in FIG. 5, cell 185 includes 48 bytes of AAL-0 cell payload which are allocated as follows. 32 PCM bytes for 32 channels (channels 0–31), 8 bytes for signaling or for ISDN D-channels (labeled signaling 1), 6 bytes for messaging (message bytes 1–6), and one byte for counting signaling frames (signal frame count). Each signaling 1 byte may include DS0 signaling for 8 channels. For example, the first signaling byte may include signaling for channels 0–7, the next signaling byte may include signaling for channels 8–15, the next signaling byte for channels 16–23 and the next for channels 24–31. Each composite cell 185 may be transmitted every 125 microseconds at 8 kcells/sec (8 kHz). It should be noted that the speed of 125 microseconds advantageously eliminates the need for echo cancellation for voice transmissions.

Referring again to FIG. 2, circuit packs 108 and 110 (AP and NU controller pack) terminating the NU Link 100, multiplex data from multiple sources in the transmit direction and demultiplex data for multiple destinations in the receive direction. The multiplexed stream carries all the data formats described above. Four GFC bits of the ATM cell headers (as shown in FIGS. 3 and 4) are preferably used to simplify the autonomous establishment of the narrowband transmission paths and the routing of all traffic at the NU Link terminations with the following illustrative convention.

The first two bits of a GFC field designate the virtual circuit category. For example, 0000B designates broadband traffic or control messages, 0100B designates a narrowband PCM cell, 1000B designates a narrowband signaling cell, 1100B designates an application pack (AP) to NU Controller control or message cell, representing the primary control link between the NU and its host terminal. The second two bits of the GFC field can be set to zero by the AP in the downstream direction. (These bits are used internally by the host terminal and are cleared and set by the application pack as needed.)

The VCs transporting the narrowband PCM and signaling exist in the NU link. Using only the GFC bits, the receiving pack can demultiplex the received cell stream and route each cell either to the narrowband path terminating device or to the broadband backplane interface 126, as appropriate. The VPI/VCI (virtual path identifier/virtual circuit identifier) fields of the ATM cell header are not used for this function.

In the transport of ATM broadband traffic, the NU Link 100 is an intermediary between a network side interface 126 (user-to-network interface (UNI), for example) on the host terminal 102 AFM pack 202 and the subscriber UNI interfaces on the NU broadband line cards 117. ATM header translation preferably takes place at two places in the system in each direction of transmission:

1. At the ATM bus interfaces, at the egress ports of the ATM interface 120 and 126 devices on the AFM (downstream) and on the application packs 108 and 110 (upstream).

2. In the NU ATM fabric (in both directions) at the ATM bus interface 126.

Since the VPI/VCI addresses used in an NU link are not visible to any other NU and to the UNI interfaces 120 and 126, the same VPI/VCI addresses can be reused on each link.

The NU Link 100 is served by a third autonomously established virtual circuit that serves as the first-tier control link between the server pack in the host terminal (HT) (i.e., the AP) and the NU controller pack (controller pack). The cell format used for this virtual circuit is also preferably AAL-0, but the transmission rate is variable. For example, the maximum rate may be set as 1 Kcells/second, the minimum rate is 1 cell/second. Between these limits, these cells are transmitted as needed to support the link. The minimum rate is intended to serve as a keep-alive signal when there is no activity on the link.

The NU Link message cells transport control and OAM&P messages between the HT and the NU. The message link extends the COMDAC's control link to the NUs.

Broadband traffic is accessed by the AP 108 via a broadband bus 171 and can be transported via any ATM Forum compliant ATM cell format over the NU Link 100. AAL-5 may be used for transporting data services. Other service classes may also be employed.

The virtual circuits serving broadband traffic are set up by the AFM of the HT as needed using VPI/VCI addresses for both directions of transmission, after the NU Message Link is active and the AP is notified that the NU is equipped to handle broadband traffic.

One or more control links connecting the broadband elements in the NU to the AFM in the host are required in systems providing broadband services. These control links may include PVCs (permanent virtual circuits) established between the AFM and the controlled elements, the NU controller pack, and the broadband APs in the NU, and will employ VPI/VCI addresses. A permanent virtual circuit is a virtual circuit that is permanently available to the user just as though the virtual circuit were a dedicated or leased line continuously reserved for that user. The NU controller pack will act as the agent for the APs; messages addressed to the broadband APs will be mapped to control processor 140 on controller pack 110.

Note that the common VPI/VCI addresses used for broadband control links are translated by the AP 108 to/from unique addresses used by the AFM ATM fabric. These unique addresses are not part of the HT-NU interface and may be specified elsewhere.

In the ANYMEDIA Access System available from Lucent Technologies, Inc., VPI-s 0 through 7 are reserved for special uses. VPI=2 is designated for control links between the AFM and subtending elements such as the AP, NU Controller, and line cards. Reserved VPIs will not be used to transport subscriber traffic.

Any VPI outside the reserved group could be used to route broadband traffic. For practical purposes the range of VPIs actually used may be restricted. The system is able to handle a minimum of one VPI per subscriber link. A minimum of 24 VPIs/NU are need, to permit for future multiple VPIs/port the system may implement, or leave hooks to implement a greater number.

The physical layer of the NU Link may transport 149.76 Mbits/sec, or 353 Kcells/sec. Narrowband PCM data and signaling for the NU, plus the maximum message channel rate needs 11 Kcells/sec of CBR bandwidth (~4.66 Mbits/sec), ~3% of the total. The remainder of the bandwidth is available to support the broadband services for both telephony and data transmissions in accordance with the invention.

The HDT's AFM pack can control the cell rate into each AP port. The NU itself will provide buffering and rate control for the cell streams delivered to each broadband line termination. For a NU supporting 12 7-Mbits/sec services the gross peak cell rate could be 84 Mbits/sec, although the average traffic will be a fraction of this. This rate could be reached if the AFM was broadcasting the same data stream to each of the 12 subscribers simultaneously.

For its broadband functions the OAP has an on-board timing generator that provides the 25-MHz references required by the UTOPIA interfaces and the multiplexer/demuliplexer devices. Since the ATM interfaces are asynchronous, the 25-MHz reference is not phaselocked to the bus clock (e.g, 8 KHz), or to the narrowband references.

Figure 6:
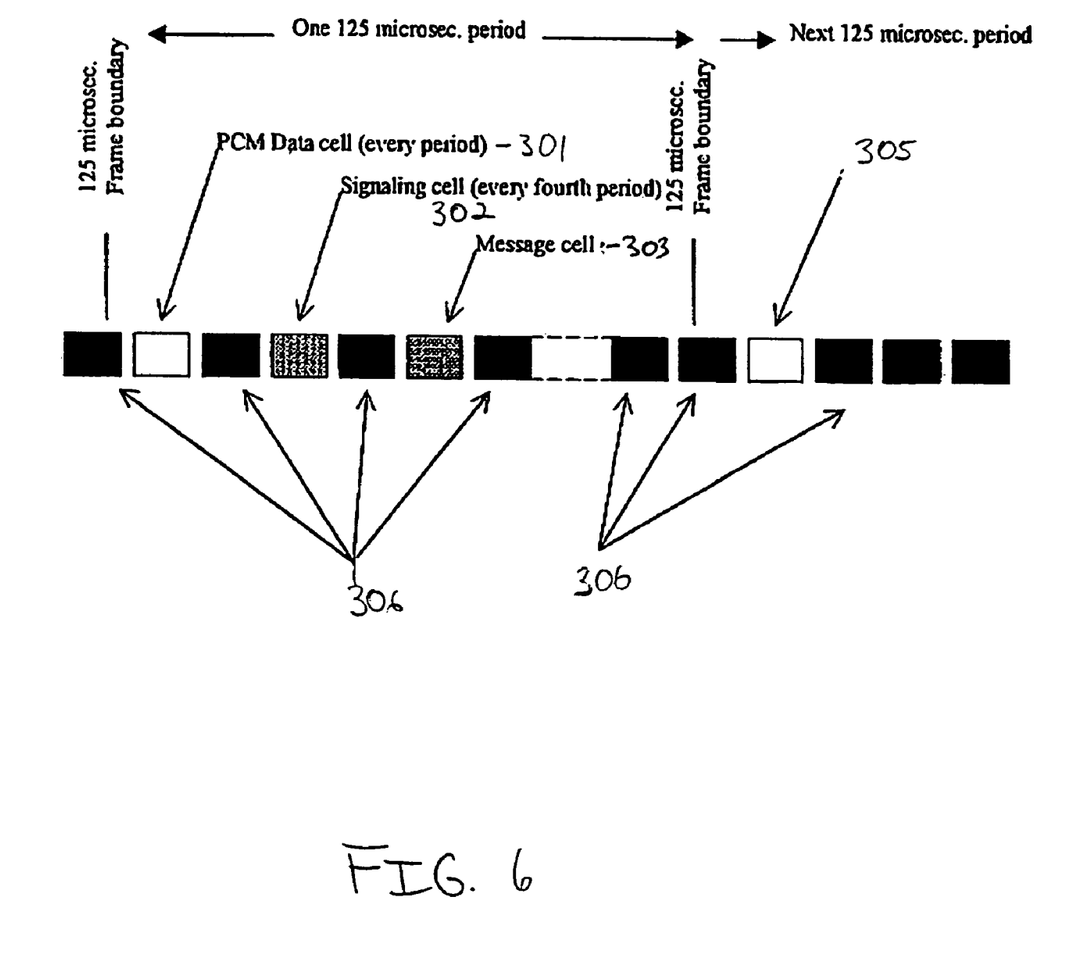
FIG. 6 is a schematic diagram of cell flow showing narrowband data, signaling and messaging ATM cells mixed with broadband data ATM cells on a same link in accordance with the present invention.

Referring to FIG. 6, a schematic diagram of a cell flow in accordance with the present invention is shown. A composite cell may include a PCM data cell 301, a signaling cell 302 and a messaging cell 303 is interspersed between ATM cells 306 on a same transmission line 106. PCM data cell 301 and signaling data cell 302 and message cell 303 are logically linked to one another such that when they are received at a target the cells can be recombined, i.e., signaling and PCM data recombine or ISDN channels B recombined with the appropriate ISDN D channels. In a preferred embodiment, PCM data cell 301 is transferred every 125 microsecond cycle while signaling data cell 302 is transferred every fourth cycle. Message cell 303 is included as needed. Other periods and rate are also contemplated. Advantageously, ATM cells 306 may include other PCM cells, signaling cells, messaging cells or broadband data. If ATM cells 306 include broadband data, the broadband data may include Internet Protocol information, video, etc. Advantageously, narrowband PCM data (e.g., voice) is transmitted on the same line 106 as broadband data. In this way, the bandwidth of line is flexibly made available to either narrowband transmission, broadband transmission or both.

Cell ordering is very flexible. For example, two cells 306 may be interspersed between cell 302 and 301 or cells 301, 302 and 303 may be interspersed between other cells 301, 302 and 303. In another example, the components of a composite cell may be adjacent to one another.

In accordance with the invention, ATM cells are employed which represent a common format for transmission of voice (cells, 301, 302 and 303) and data (306) over a common link 106. In one embodiment, AAL-0 cells carrying voice frequency (VF) traffic (e.g., cells, 301, 302 and 303) and AAL-5 cells carrying data (e.g., 306) are both 53 Byte packages, routed through the ATM fabric. In the alternate embodiment described in FIG. 5, a single cell 305 carries PCM data, signaling and messaging. The present invention is preferably practiced by either employing composite cells with separated components (PCM data cell 301, signaling cell 302 and messaging 303) or a single cell format (cell 305). However, both formats may be employed if the hardware/software is appropriately configured.

Having described preferred embodiments transporting voice telephony and data via a single ATM transport link (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for asynchronously transporting narrowband and broadband transmissions over a link comprising:
   providing at least one host terminal for receiving and transmitting communications over a transmission link;
   converting narrowband transmissions to and from composite asynchronous transfer mode (ATM) cells by separating data and signaling portions of said narrowband transmissions into separate byte positions in each of the composite ATM cells; and
   transferring the composite asynchronous transfer mode (ATM) cells over the transmission link, the composite asynchronous transfer mode (ATM) cells including both narrowband and broadband composite cells such that an entire bandwidth of the transmission fee link is available for both narrowband and broadband transmissions.

2. The method as recited in claim 1, wherein at least one of said composite ATM cells includes integrated services digital network (ISDN) data and voice telephony data.

3. The method as recited in claim 1, wherein the composite ATM cells include a first composite cell which includes data for a plurality of channels, a second composite cell which includes signaling information associated with each of the plurality of channels and a third composite cell which includes messaging information associated with each of the plurality of channels.

4. The method as recited in claim 1, wherein the composite ATM cells each include data for a plurality of channels, signaling information associated with each of the plurality of channels and messaging information associated with each of the plurality of channels.

5. The method as recited in claim 1, further comprising the step of connecting the host terminal to a optical network unit by employing the transmission line.

6. A method for asynchronously transporting narrowband and broadband transmissions over a link comprising:
   providing at least one host terminal for receiving and transmitting communications over a transmission link;
   converting narrowband transmissions to and from composite asynchronous transfer mode (ATM) cells by separating data and signaling portions of said narrowband transmissions into separate byte positions in each of the composite ATM cells; and
   transferring the composite asynchronous transfer mode (ATM) cells over the transmission link, the composite asynchronous transfer mode (ATM) cells including both narrowband and broadband composite cells such that an entire bandwidth of the transmission line is available for both narrowband and broadband transmissions and wherein the composite ATM cells are transferred periodically and the method further comprising the step of transporting the first composite ATM cell of each pair every period and the second composite ATM of each pair every fourth period.

7. A method for asynchronously transporting narrowband and broadband transmissions over a link comprising:
   providing at least one network unit for receiving and transmitting communications over a transmission link;
   converting narrowband transmissions to and from composite asynchronous transfer mode (ATM) cells by separating data and signaling portions of said narrowband transmissions into separate byte positions in each of the composite ATM cells; and
   transferring the composite asynchronous transfer mode (ATM) cells over the transmission link, the composite asynchronous transfer mode (ATM) cells including both narrowband and broadband composite cells such that an entire bandwidth of the transmission link is available for both narrowband and broadband transmissions.

8. The method as recited in claim 7, wherein at least one of said composite ATM cells includes integrated services digital network (ISDN) data and voice telephony data.

9. The method as recited in claim 7, wherein the composite ATM cells include a first composite cell which includes data for a plurality of channels, a second composite cell which includes signaling information associated with each of the plurality of channels and a third composite cell which includes messaging information associated with each of the plurality of channels.

10. The method as recited in claim 7, wherein the composite ATM cells each include data for a plurality of channels, signaling information associated with each of the plurality of channels and messaging information associated with each of the plurality of channels.

11. The method as recited in claim 7, further comprising the step of connecting the network unit to a host terminal by employing the transmission line.

12. A method for asynchronously transporting narrowband and broadband transmissions over a link comprising:
   providing at least one host terminal for receiving and transmitting communications over a transmission link;
   converting narrowband transmissions to and from composite asynchronous transfer mode (ATM) cells by separating data and signaling portions of said narrowband transmissions into separate byte positions in each of the composite ATM cells; and
   transferring the composite asynchronous transfer mode (ATM) cells over the transmission link, the composite asynchronous transfer mode (ATM) cells including both narrowband and broadband composite cells such that an entire bandwidth of the transmission link is available for both narrowband and broadband transmissions and wherein the composite ATM cells are transferred periodically and the method further comprising the step of transporting the first composite ATM cell of each pair every period and the second composite ATM of each pair every fourth period.

13. A system for asynchronously transporting narrowband and broadband transmissions over a link comprising:
at least one host terminal for receiving communications from and transmitting communications to a back plane;
at least one network unit coupled to the at least one host terminal by a transmission line; and
the at least one host terminal and the at least one network unit each including a circuit pack for converting narrowband communications to and from composite asynchronous transfer mode (ATM) cells such that an entire bandwidth of the transmission line is available for both narrowband and broadband transmissions, where data and signaling portions of said narrowband transmissions are separated into separate byte positions in each of the composite ATM cells.

14. The system as recited in claim 13, wherein the circuit pack includes a narrowband interface for converting pulse modulated signals to and from the composite asynchronous transfer mode (ATM) cells.

15. The system and recited in claim 13, wherein the circuit pack includes a broadband interface for converting broadband signals to and from the composite asynchronous transfer mode (ATM) cells.

16. The system as recited in claim 13, wherein the circuit pack includes a multiplexer for addressing information between a narrowband and a broadband interface.

17. The system as recited in claim 13, wherein the network unit is co-located with a service subscriber.

18. The system as recited in claim 13, wherein the composite ATM cells include header information employed for directing the composite ATM cells to a destination.

19. The system as recited in claim 13, wherein the composite ATM cells include a first composite cell which includes data for a plurality of channels, a second composite cell which includes signaling information associated with each of the plurality of channels and a third composite cell which includes messaging information associated with each of the plurality of channels.

20. The system as recited in claim 13, wherein the composite ATM cells each include data for a plurality of channels, signaling information associated with each of the plurality of channels and messaging information associated with each of the plurality of channels.

21. A system for asynchronously transporting data and voice telephony over a link comprising:

a host digital terminal for receiving communications from and transmitting communications to a back plane, the back plane providing both narrowband and broadband communications from a network;
an optical network unit coupled to the host digital terminal by an optical transmission line;
the host digital terminal and the optical network unit each include a circuit pack for converting the narrowband communications to and from composite asynchronous transfer mode (ATM) cells, the circuit pack including a narrow band interface and a broadband interface for selectively transporting information over the optical transmission line such that an entire bandwidth of the optical transmission line is available for both voice telephony and data transmissions, where data and signaling portions of said narrowband communications are separated into separate byte positions in each of the composite ATM cells.

22. The system as recited in claim 21, wherein the narrowband interface converts pulse modulated signals to and from the composite asynchronous transfer mode (ATM) cells.

23. The system as recited in claim 21, wherein the broadband interface converts broadband signals to and from the composite asynchronous transfer mode (ATM) cells.

24. The system as recited in claim 21, wherein the circuit packs include a multiplexer for selectively transporting information between the narrowband and the broadband interfaces.

25. The system as recited in claim 21, wherein the optical network unit is co-located with a service subscriber.

26. The system as recited in claim 21, wherein the composite ATM cells include header information employed for directing the composite ATM cells to a destination.

27. The system as recited in claim 21, wherein the composite ATM cells include a first composite cell which includes data for a plurality of channels, a second composite cell which includes signaling information associated with each of the plurality of channels and a third composite cell which includes messaging information associated with each of the plurality of channels.

28. The system as recited in claim 21, wherein the composite ATM cells each include data for a plurality of channels, signaling information associated with each of the plurality of channels and messaging information associated with the plurality of channels.

\* \* \* \* \*